Dec. 30, 1930. W. A. LELEAN ET AL 1,787,114
NUT LOCKING DEVICE
Filed April 28, 1930
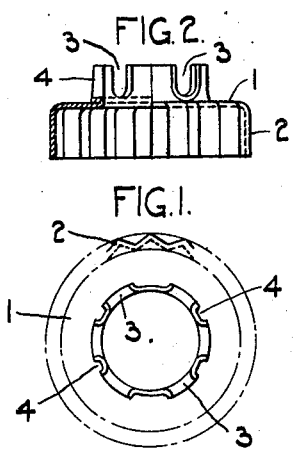
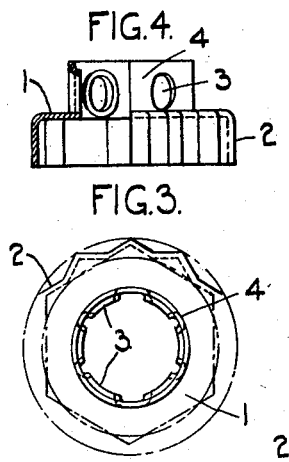
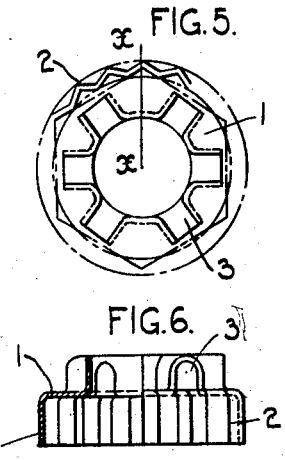
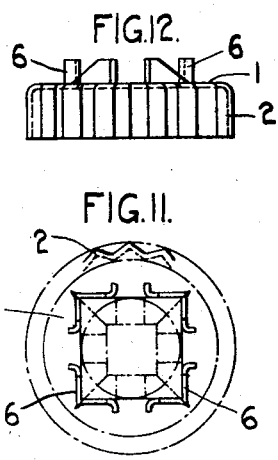
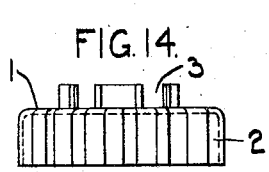
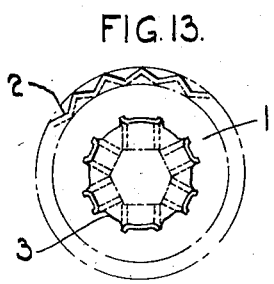

Patented Dec. 30, 1930

1,787,114

UNITED STATES PATENT OFFICE

WILLIAM ARTHUR LELEAN, OF ELTHAM, LONDON, AND DERRICK CHARLES BROWN, OF KENTON, ENGLAND

NUT-LOCKING DEVICE

Application filed April 28, 1930, Serial No. 448,024, and in Great Britain April 11, 1929.

To prevent nuts working loose it is common practice in engineering (a) to pass a pin or cotter through a hole in the bolt and bearing against the outer face of the nut, or (b) to form the nut with holes or castellations and to pass a pin or cotter through the nut and through a hole in the bolt.

When method (a) is adopted it is possible, where nuts are subjected to intermittent pressure, for the pin or cotter to be sheared off through repeated slacking back of the nut against the pin or cotter, and thus complete safety is not ensured.

When method (b) is employed the repeated slackening back of the nut is prevented so that the pin or cotter cannot be sheared off and safety is thus ensured.

The use of method (b) however involves filing or otherwise fitting each nut so that the holes for the pin or cotter shall register when the nut is tight. This involves frequent removals of the nut. A workman is therefore tempted, after tightening the nut, either to slacken the nut back to the previous hole or castellation to fit in the pin or cotter, or to further tighten the nut so as to get the pin or cotter into the next hole or castellation and thus overstrain the bolt. In the said usual locking arrangements accordingly the fineness of adjustment obtainable is insufficient.

It has, however, been heretofore proposed to lock nuts by the engagement with the nut of projections on one side of a locking washer and by passing a pin or cotter through holes, slots, or recesses formed in or by parts projecting from the other side of the locking washer, the construction being such that a slight turn of the locking washer brings a pair of said holes, slots, or recesses into register with a hole in the bolt or the like through which the pin or cotter can be passed to effect the locking.

The object of the present invention is to provide an improved construction of this type of locking device of simple character, robust construction, and by the use of which a practicable degree of fineness of adjustment can be effected readily.

According to the invention a locking member or washer adapted to fit freely on a bolt or the like has, on one side an annular flange adapted to surround an ordinary hexagon or square nut or the like, the said annular flange being formed with a plurality of angular recesses or corrugations adapted to engage the corners of the nut or the like in any one of a number of angular positions in such a manner that relative rotation between said member and the nut or the like is prevented; the other side of the locking member or washer having upstanding parts forming or formed with diametrical open recesses, holes or slots, through any pair of which can be passed a split pin or the like which also passes through a hole in the bolt or the like, the construction being such as to enable fine adjustment of the nut to be obtained readily.

With advantage and preferably the nut engaging recesses and the means adapted to engage a split pin, cotter or the like are of such a number and so spaced, evenly or unevenly, as to give a vernier effect in order to allow of the required fineness of adjustment. It is thus possible to provide a degree of fineness of adjustment suitable for most practical purposes and at the same time to lock the two parts in position after adjustment with a degree of security at least as great as is obtainable by means of an ordinary castellated nut and cotter or split pin.

Conveniently, but not essentially, the improved locking members or washers having the recessed or corrugated annular flange may be made of pressed or stamped metal, the upstanding parts comprising the engagements for the split pin or the like being produced by appropriate deformation of the plate constituting the flat part or body of the locking member or washer.

The accompanying drawings illustrate by way of example several constructions of locking members or washers embodying the invention. The several examples illustrated are made of stamped or pressed metal but, as above stated, the invention is not restricted in this respect.

Fig. 1 is a plan and Fig. 2 an elevation, partly in section, illustrating one construction of locking washer according to the invention.

Figs. 3 and 4 are similar views to Figs. 1 and 2, respectively, illustrating a modification.

Fig. 5 is an underside plan, and Fig. 6 an elevation partly in section on the line x x of Fig. 5 illustrating another construction.

Fig. 7 is an underside plan and Fig. 8 an elevation, illustrating another construction.

Figs. 9 and 10 are similar views to Figs. 1 and 2, respectively, illustrating another construction.

Fig. 11 is a plan and Fig. 12 an elevation illustrating a further construction.

Figs. 13 and 14 are similar views to Figs. 11 and 12, respectively, illustrating another construction.

Fig. 15 is an underside plan, Fig. 16 an elevation and Fig. 17 a detail view illustrating another construction.

In the construction shown in Figs. 1 and 2, the device comprises a washer 1 from which depends an annular flange 2 adapted to fit easily over a nut. The said annular flange 2 is corrugated or formed with a plurality of recesses adapted to engage the corners of the nut in order to prevent any relative rotary movement between the nut and the locking member. 3 indicates open recesses formed in a collar or flange 4 upwardly pressed out of the flat part or body 1 of the washer and through any diametrical pair of which a split pin or cotter can be passed. In the construction shown the flange 2 is provided with eighteen equally spaced recesses for engagement with the corners of a nut and the body with six open recesses 3 for engagement by a pin or cotter. The said open recesses are diametrically arranged in pairs, but as will be seen from Fig. 1 certain of the recesses are unevenly spaced. As an example if, as shown, instead of all being spaced at 60° apart four of them arranged diametrically are arranged at 60° minus 6 2/3° from the other two arranged diametrically an adjustment of 1/54th of a turn is obtainable. This construction therefore provides for adjustment fine enough for practical purposes. In order to provide adequate bearing surfaces for the pin or cotter the sides of the recesses 3 are flanged or bent outwardly as shown or they may be bent inwardly if so preferred. This, however, is not essential as in some cases the recesses may be left unflanged.

In the construction shown in Figs. 3 and 4 holes 3 for the pin or cotter are formed in an upstanding flange 4 of the washer 1. Preferably as shown the holes are flanged outwardly to provide adequate bearing surfaces for the pin or cotter, but they may be flanged inwardly or plain holes without such flanges may be used.

In the construction shown in Figs. 5 and 6 the device is similar to that shown in Figs. 1 and 2, except that, for engagement by a pin or cotter, arches 3 are pressed upwardly out of the flat part or body 1 of the washers.

The construction shown in Figs. 7 and 8 is similar to that shown in Figs. 5 and 6, except that in this case there is not any upstanding web between the arches 3.

Figs. 9 and 10 illustrate a construction in which ears or tabs 5 are punched up out of the metal washer 1 to provide the pin or cotter engaging recesses 3. As shown these ears or tabs are bent inwardly to provide a bearing surface of adequate area for the locking pin or cotter but they may be flanged outwardly or the flanging may be omitted.

Figs. 11 and 12 illustrate a construction in which, by suitably pressing up portions of the washer 1, flanged lugs 6 are formed for the locking pins or cotters.

In the construction shown in Figs. 13 and 14 six diametrical recesses 3 for the pin or cotter are formed by pressing up the central portion of the metal washer as shown.

In the construction shown in Figs. 15, 16 and 17 the pin or cotter engaging parts are constituted by lugs 7 pressed upwardly from the body of the metal washer 1. In the example shown the lugs are so arranged as to provide four equally spaced recesses for the reception of a pin or cotter and thus give an adjustment of 1/36th of a turn, but other numbers of such lugs may be employed if finer adjustment be necessary.

It will be seen that in Figs. 3 and 4 the annular flange 2 is shown as having twelve angular recesses for engaging the corners of a nut which gives an adjustment of 1/36th of a turn which may give the necessary degree of fineness in certain cases but generally it may be found desirable to provide eighteen angular recesses as shown in the other constructions although any other desired number of recesses may be adopted according to the fineness of the degree of adjustment required.

It will be appreciated that a practical degree of fineness of adjustment is obtainable by use of the improved locking washers, and that they are cheap to manufacture, robust in construction and that, owing to their formation, strength sufficient for the purpose can be obtained with very light weight so that the washers can be used on moving parts without injuriously increasing their mass and consequently their inertia. The design moreover is such as not to wear through or shear the split pins or the like. It is also to be noted, that, if desired, the recesses or slots for split locking pins or cotters can be tapered and made wider at the top so that when the split pin or cotter is pressed home and its limbs opened out it will hold the washer down in contact with the nut.

The constructions illustrated are not intended to restrict the invention as modifications and variations may be made without departure from the invention.

What we claim is:—

1. A locking member adapted to fit freely on a bolt or the like and having on one side an annular flange adapted to surround an ordinary hexagon or square nut or the like, the said annular flange being formed with a plurality of angular recesses or corrugations adapted to engage the corners of the nut or the like in any one of a number of angular positions in such a manner that relative rotation between said member and the nut or the like is prevented, and having at its other side upstanding parts forming or formed with diametrical recesses, holes, or slots, through any pair of which can be passed a split pin or the like which also passes through a hole in the bolt or the like, the construction being such as to enable fine adjustment of the nut or the like to be obtained readily substantially as hereinbefore decribed for the purpose specified.

2. A locking member according to the preceding claim having a plurality of diametrical recesses, holes, or slots, for the split pin or the like, the said holes, recesses or slots being unequally spaced for the purpose specified.

In testimony whereof we affix our signatures.

WILLIAM ARTHUR LELEAN.
DERRICK CHARLES BROWN.